US009363110B2

(12) United States Patent
Zhang et al.

(10) Patent No.: US 9,363,110 B2
(45) Date of Patent: Jun. 7, 2016

(54) APPARATUS AND METHODS FOR ESTIMATING OPTICAL ETHERNET DATA SEQUENCES

(71) Applicant: QUALCOMM INCORPORATED, San Diego, CA (US)

(72) Inventors: Haitao Zhang, Beijing (CN); Yin Huang, Beijing (CN); Jian Li, Beijing (CN); Yisheng Xue, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/646,360

(22) PCT Filed: Jan. 8, 2013

(86) PCT No.: PCT/CN2013/070196
§ 371 (c)(1),
(2) Date: May 20, 2015

(87) PCT Pub. No.: WO2014/107835
PCT Pub. Date: Jul. 17, 2014

(65) Prior Publication Data
US 2015/0312056 A1     Oct. 29, 2015

(51) Int. Cl.
*H03H 7/30*      (2006.01)
*H04L 25/02*    (2006.01)
(Continued)

(52) U.S. Cl.
CPC ............ *H04L 25/0212* (2013.01); *H04B 10/60* (2013.01); *H04L 1/0054* (2013.01); *H04L 25/03057* (2013.01)

(58) Field of Classification Search
CPC .............. H04L 25/0212; H04L 1/0054; H04L 25/03057; H04B 10/60
See application file for complete search history.

(56) References Cited

U.S. PATENT DOCUMENTS 5,285,480 A * 2/1994 Chennakeshu ...... H04B 7/2643
370/337
5,579,344 A * 11/1996 Namekata ......... H04L 25/03337
375/232
(Continued)

FOREIGN PATENT DOCUMENTS

CN         101170527 A    4/2008
EP           2501089 A2    9/2012

OTHER PUBLICATIONS

Crivelli et. al "Architecture and Experimental Evaluation of a 10Gb/s MLSD-Based Transceiver for Multimode Optical Fibers" IEEE International Conference on Communications, ClariPhy Communications, Inc. 2008, pp. 1-6.
(Continued)

*Primary Examiner* — Syed Haider
(74) *Attorney, Agent, or Firm* — Paradice and Li LLP

(57) ABSTRACT

A receiver is disclosed that includes a slicer having an input to receive a sequence of symbols exhibiting inter-symbol-interference (ISI). The slicer determines a state associated with each symbol based on a threshold. A feedback equalization unit is coupled to the slicer to apply equalization to the symbol fed to the slicer input based on prior detected symbol states. A Least-Mean-Square (LMS) unit cooperates with the slicer and feedback equalization unit to estimate a channel impulse response based on the equalized symbols. The LMS unit feeds the estimated channel impulse response to a Maximum-Likelihood-Sequence-Estimation (MLSE) unit to generate an estimated sequence of bits based on the estimated channel impulse response.

19 Claims, 7 Drawing Sheets

(51) Int. Cl.
*H04L 25/03* (2006.01)
*H04B 10/60* (2013.01)
*H04L 1/00* (2006.01)

(56) References Cited

U.S. PATENT DOCUMENTS

| | | | |
|---|---|---|---|
| 7,551,688 B2 | 6/2009 | Matero et al. | |
| 7,778,320 B2 | 8/2010 | Agazzi et al. | |
| 7,961,054 B2 | 6/2011 | Edwards et al. | |
| 8,208,529 B2 | 6/2012 | Yang et al. | |
| 2003/0223489 A1* | 12/2003 | Smee | H04L 1/188 375/233 |
| 2004/0001538 A1* | 1/2004 | Garrett | H04L 25/03057 375/229 |
| 2004/0228398 A1* | 11/2004 | Kim | H04L 25/03057 375/232 |
| 2005/0019042 A1* | 1/2005 | Kaneda | H04B 10/695 398/208 |
| 2005/0111539 A1 | 5/2005 | Tsuchiya | |
| 2006/0291552 A1* | 12/2006 | Yeung | H04L 25/03885 375/233 |
| 2009/0185613 A1* | 7/2009 | Agazzi | H03M 1/0626 375/232 |
| 2011/0052216 A1 | 3/2011 | Jiang et al. | |
| 2012/0051418 A1* | 3/2012 | Yang | H04L 25/03057 375/233 |

OTHER PUBLICATIONS

International Search Report and Written Opinion—PCT/CN2013/070196—ISA/EPO—Oct. 17, 2013.

\* cited by examiner ized amplifier (TIA) 112, and an EDC circuit 114. The EDC circuit receives a data stream from the TIA that exhibits a high degree of inter-symbol interference (ISI).

APPARATUS AND METHODS FOR ESTIMATING OPTICAL ETHERNET DATA SEQUENCES

TECHNICAL FIELD

The disclosure herein relates generally to high-speed Ethernet systems and associated methods, and more particularly to Long Range Multimode (LRM) implementations of 10GBASE receivers.

BACKGROUND OF RELATED ART

A variety of high-speed Ethernet standards have been proposed for transferring data at speeds up to 10 Gb/s. One such standard, 10GBASE-LRM, transmits data over optical multimode fibers (MMF) up to distances of 220 meters. Backwards compatibility requirements for the 10GBASE-LRM standard dictate that the receiver circuitry be able to decode data transmissions accurately without an initial training sequence of data to calibrate the channel. As a result, 10GBASE-LRM receivers employ electronic dispersion compensation (EDC) technology to accurately resolve incoming data streams that are susceptible to inter-symbol-interference (ISI).

One conventional way to achieve suitable EDC results is to employ a Viterbi-decoder that takes a known channel impulse response (CIR) as an input and estimates an output sequence from an ISI-impacted input sequence of bits. Typically, a feed-forward equalizer (FFE) having complex tap adaptation and selection circuitry processes an input bit sequence and cooperates with a Least-Mean-Square Channel Estimator (LMS-CE) to generate the channel impulse response. The CIR is fed to a "Maximum-Likelihood-Sequence-Estimation" (MLSE) circuit, which includes the Viterbi decoder.

While the conventional sequence estimation circuit described above works well for its intended applications, the use of a complex feed-forward equalizer generally involves a form of finite impulse response filtering, which often results in multiplication operations for a digital system processor (DSP). Further, the FFE generally includes a set of adaptive taps that are separate from the LMS-CE taps, thus adding to the circuit complexity.

BRIEF DESCRIPTION OF THE DRAWINGS

The present embodiments are illustrated by way of example and are not intended to be limited by the figures of the accompanying drawings.

DETAILED DESCRIPTION

Figure 1:
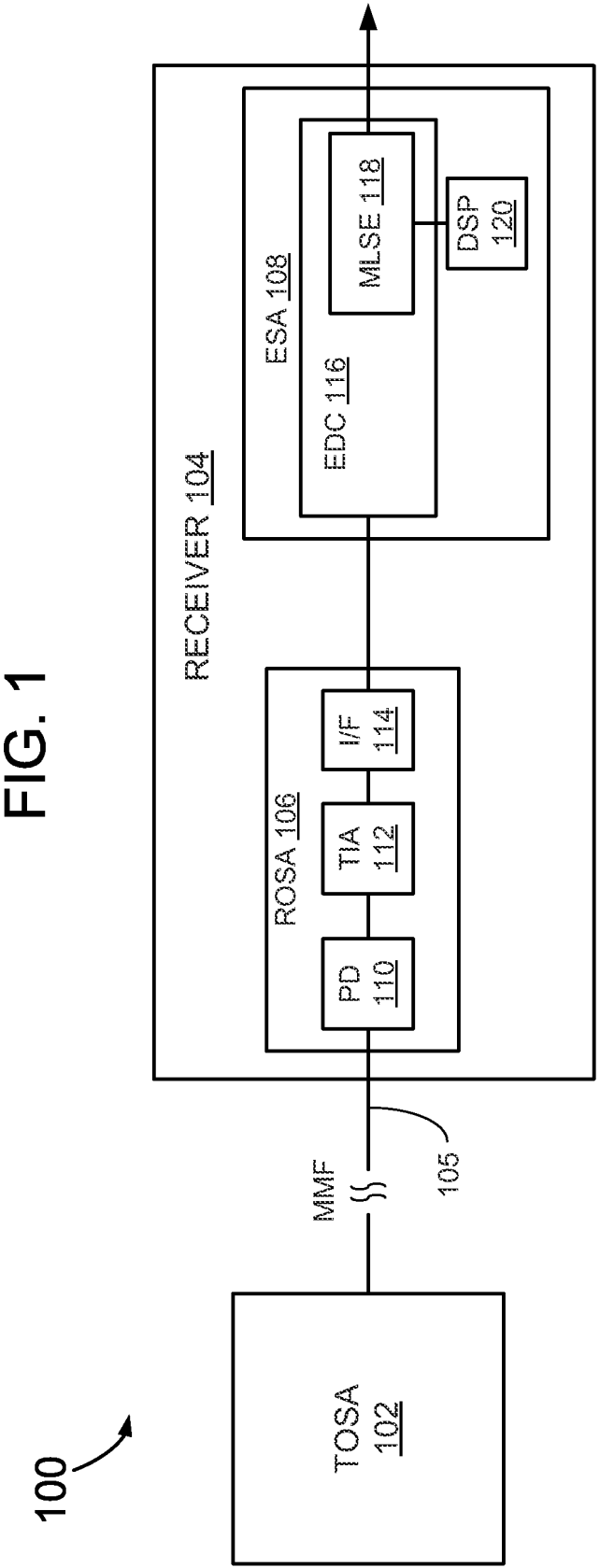
FIG. 1 is a block diagram of one embodiment of a 10GBASE-LRM channel.

Embodiments of receiver circuits and associated methods are disclosed. In one embodiment, the receiver circuit includes a slicer having an input to receive a sequence of symbols exhibiting inter-symbol-interference (ISI). The slicer determines a state associated with each symbol based on a threshold input. Feedback equalization circuitry is coupled to the slicer to apply equalization to the symbol fed to the slicer input based on prior detected symbol states. A Least-Mean-Square (LMS) circuit cooperates with the slicer and feedback equalization circuitry to estimate a channel impulse response based on the equalized symbols. The LMS circuit feeds the estimated channel impulse response to a Most-Likely-Sequence-Estimation (MLSE) circuit to generate an estimated sequence of bits based on the estimated channel impulse response. By implementing a slicer-based circuit to estimate the channel impulse response instead of an FIR filter, the complexity of the EDC circuitry may be reduced.

In one embodiment, a method of determining an output data sequence from an input sequence affected by ISI is disclosed. The method includes receiving an input symbol sequence and slicing the input symbol sequence to initially determine respective symbol states. The selected determined symbol states are fed back to the slicer input to equalize the input symbol sequence. A channel impulse response is estimated based on the slicing and feeding back. A most likely sequence of output bits is then estimated based on the estimated channel impulse response.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

More specifically, and referring generally to FIG. 1, one embodiment of a 10GBASE-LRM channel 100 is illustrated. The 10GBASE-LRM channel 100 employs a transmitter optical sub-assembly (TOSA) 102 to transmit data along multimode fiber (MMF) 105 to a link partner receiver 104. The receiver 104 includes a receiver optical sub-assembly (ROSA) 106 that employs a photodiode (PD) 110, transimpedance amplifier (TIA) 112, and an optical-to-electrical interface (I/F) 114 that couples to the TIA.

The ROSA 106 generally converts the optical signals transmitted along the multimode fiber 105 to electrical signals. The electrical signals are then fed to an electrical sub-assembly (ESA) 108 that includes an electronic dispersion compensation unit (EDC) 116. The EDC unit 116 estimates a channel impulse response (CIR), and includes an MLSE unit 118 as more fully described below. A digital signal processor (DSP) 120 interacts with the EDC 116 to estimate the correct sequence of bits that were fed to the EDC 116 based on an estimation technique such as, for example, a Viterbi-based algorithm.

Figure 2:
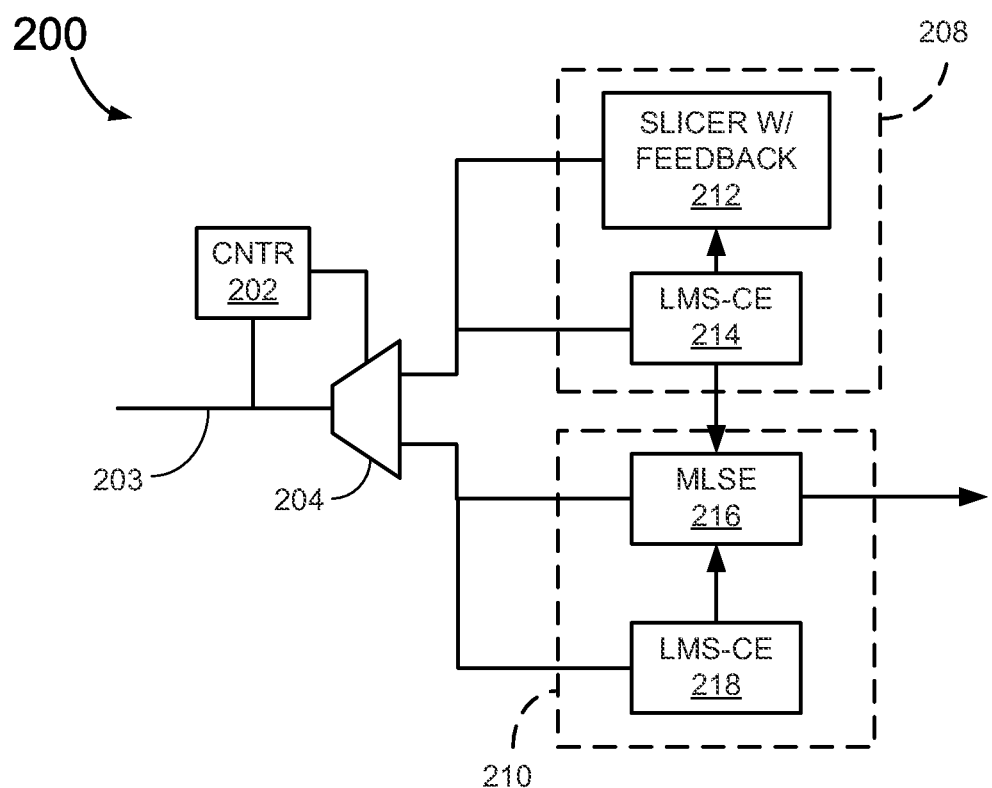
FIG. 2 illustrates one embodiment of an EDC architecture suitable for use in the channel of FIG. 1.

FIG. 2 illustrates further detail of one embodiment of an EDC, generally designated 200, that minimizes complexity within the receiver 104 to thus enhance implementation. The EDC 200 includes a counter 202 that monitors a count of the number of symbols received along an input path 203, and provides a control signal based on the count to a selector 204. The selector 204 steers the bit sequence first to a coarse channel estimation unit 208. The coarse channel estimation unit 208 generally develops a first estimation of the channel response. In one embodiment, the coarse channel estimation unit 208 includes a slicer with feedback 212. The slicer with feedback 212 generally makes decisions of each symbol state. The coarse channel estimation unit 208 also includes a Least-Mean-Square Channel Estimator (LMS-CE) 214 that cooperates with the slicer with feedback 212 to generate the estimated initial channel response.

Further referring to FIG. 2, the initial channel response generated by the coarse channel estimation unit 208 is fed to a fine channel estimation unit 210. The fine channel estimation unit generally develops a more accurate channel response for determining the sequence of symbols. The fine channel estimation unit 210 includes a Most-Likely-Sequence-Estimator (MLSE) unit 216 that in one embodiment operates in accordance with a Viterbi algorithm to generate an estimated output bit sequence. The MLSE unit 216 interfaces with a second LMS-CE unit 218 to further refine the channel estimation. In one embodiment, a single LMS-CE unit may be shared by the coarse channel estimation unit 208 and the fine channel estimation unit 210. Once the fine channel estimation unit 210 has properly converged on an accurate channel response estimation, data sequences may be steered directly to the fine channel estimation unit from the input path 203 via the selector 204.

Figure 3:
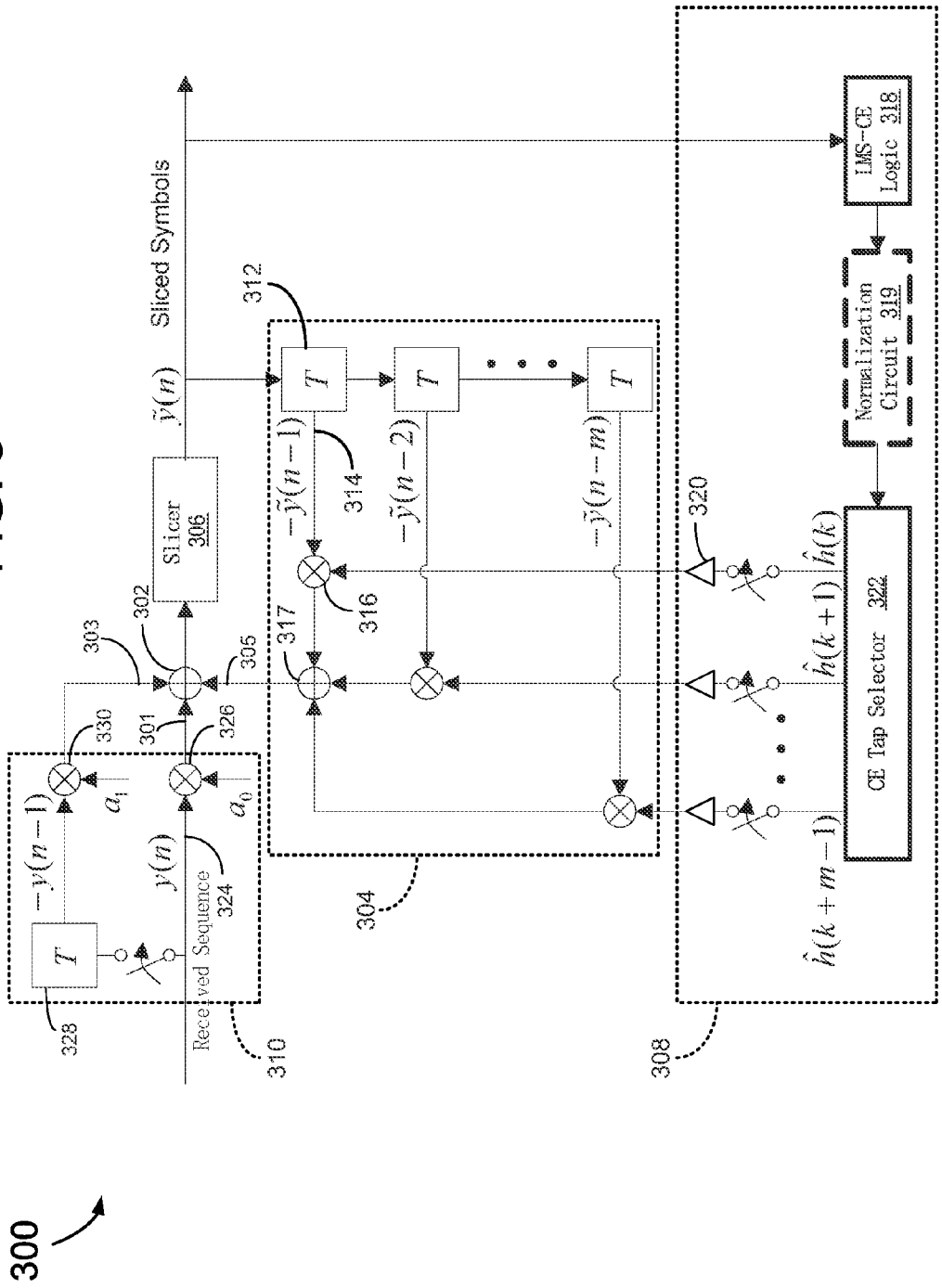
FIG. 3 shows one detailed implementation of a coarse channel estimation circuit for use in an EDC architecture such as that illustrated in FIG. 2.

FIG. 3 illustrates further detail of one embodiment of a coarse channel estimation unit, generally designated 300, that provides the functionality of the coarse channel estimation unit 208 of FIG. 2. The unit 300 includes an input symbol summer 302 that aggregates received symbol voltages at 301 with precursor and post-cursor compensation voltages, at 303 and 305, respectively, that are provided by an optional equalizer unit 310 and incremental feedback units 304. A slicer 306, such as a straightforward comparator having an input reference to "0" volts, generates decisions on the states of the received input symbols. The incremental feedback units 304 cooperate with an LMS-CE unit 308 to provide a level of feedback equalization to the summer 302 and compensate for post-cursor inter-symbol-interference (ISI) affecting the channel. For one embodiment, the optional linear equalizer 310, such as a fixed-tap feed-forward equalizer, may be employed in a limited capacity to compensate for pre-cursor ISI.

Further referring to FIG. 3, the incremental feedback units 304 include a series-coupled delay line of delay elements 312 that couples to the output of the slicer 306. The delay elements 312 each exhibit a delay of one symbol time T, or unit interval. As a given symbol ŷ(n) is output from the slicer 306, it propagates through each delay element. A sequence of symbols thus proceeds through the delay line in a serially-shifted manner, generally corresponding to previous received symbols. Each delay element 312 includes a tap output 314 that feeds a multiplier 316. Each multiplier receives an inverted version of a particular symbol, or bit value, and applies a weighting value to the symbol. The outputs from the multipliers 316 are fed to a feedback summer 317, which aggregates or sums all of the feedback compensation voltages from the various feedback paths and feeds the aggregated feedback voltage to the input summer 302. The weightings applied to each multiplier 316 generally dictate how each subsequent symbol will contribute to the overall compensation applied at the summer 302. Generally, the most recent symbols usually contribute the most to ISI, and the weightings for those taps are often higher than more latent symbols.

Further referring to FIG. 3, the LMS-CE unit 308 includes LMS-CE logic 318 that determines the weightings to apply to the multipliers 316 based on an error-minimization algorithm such as the well-known LMS algorithm. Other algorithms that optimize weightings based on detected errors may also be employed. The LMS-CE logic 318 receives a version of the sliced symbols and applies the LMS algorithm to the symbols. An optional normalization process may be carried out by a normalization unit 319. The LMS-CE unit further includes a plurality of equalizer taps 320. Each tap generally exhibits an adjustable gain corresponding to the desired weighting for that tap, and generally corresponds to a post-cursor. Post-cursors are ISI effects caused by one or more prior received symbols. A first post-cursor tap is identified by ĥ(k), with subsequent post-cursor taps identified by ĥ(k+1), through ĥ(k+m−1).

As explained earlier, for one embodiment, the weightings for each tap may be adjusted based on the LMS algorithm applied to the received symbol sequence. The taps are selectively applied to the multipliers 316 via a CE tap selector 322 that controls a plurality of switches to enable selected taps. The selected taps define a channel estimation window more fully described below. In one embodiment, the switches are sequentially activated in a sequence to incrementally apply feedback from multiple feedback paths. Over a series of iterations, the LMS algorithm will enable the coarse channel estimation unit 300 to converge to a desired coarse channel response through iterative adjustments of the tap weightings.

With continued reference to FIG. 3, the optional linear equalizer unit 310 in one embodiment takes the form of a feed-forward equalizer to compensate for pre-cursor ISI. The linear equalizer unit 310 includes a main cursor path 324 that coincides with the input path of the received sequence of symbols. A first multiplier 326 applies a fixed or pre-programmed main cursor tap value a0 (often a value of "1") to each received symbol. A delay element 328 is selectively coupled to the main cursor path 324 and exhibits a delay T corresponding to the symbol interval time. A second multiplier 330 receives a first pre-cursor tap value a1 to apply to the delayed symbol. The current symbol y(n) and an inverted version of the delayed symbol representing a previously received symbol y(n−1) are then summed at the summing unit 302 to compensate for the anticipated effects of pre-cursor ISI.

In operation, the tap length of the channel being estimated is set to a value "L", and the tap length of the channel estimation window is set to "2L." In a first stage of operations, the LMS-CE logic calculates the tap weightings based on the following expressions:

$$e(n)=y(n-L)-\hat{h}^T(n)\tilde{y}(n)$$

$$\hat{h}(n+1)=\hat{h}(n)+\mu e(n)\tilde{y}(n)$$

where $\tilde{y}(n)$ represents the output of the slicer, $\hat{h}(n)$ represents a channel estimation of the LMS-CE, e(n) represents an error signal, and μ represents a step size. In a second stage of operations, the CE tap selector 322 selects the largest consecutive taps within the channel estimation window based on a criteria such as peak energy. The detected symbol after ISI cancellation is given by:

$$\tilde{y}(n) = \text{sgn}\left\{y(n) - \sum_{m'=1}^{m} \hat{h}(k+m')\tilde{y}(n-m')\right\}, m = 1, \ldots, M$$

where: $\hat{h}(k)$ represents a channel estimation tap with the peak energy, m represents the current feedback tap number used for ISI cancellation, M represents a maximum feedback tap number, and sgn { } represents a sign function which extracts the sign of a real number. The initial states of the tap weightings are based on the tap feedbacks' converged states.

Figure 4:
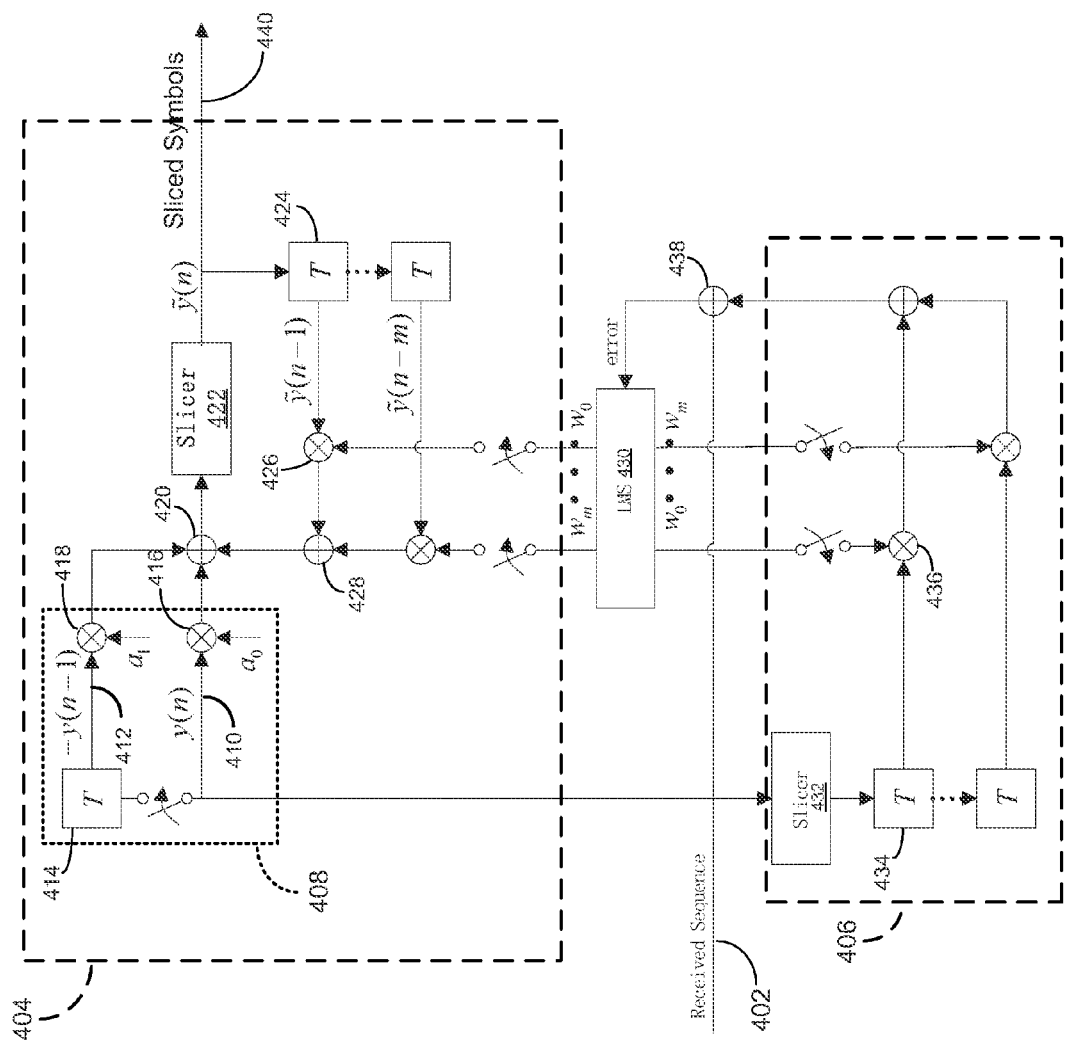
FIG. 4 illustrates an alternative embodiment of a coarse channel estimation circuit similar to the circuit shown in FIG. 3.

FIG. 4 illustrates a further embodiment of a coarse channel estimation unit, generally designated 400. A received sequence of symbols along an input path 402 feeds respective first and second unit branches 404 and 406. The first unit branch 404 includes an optional linear equalizer 408 similar to that described with respect to FIG. 3, with respective main and first precursor paths 410 and 412, delay element 414, and multipliers 416 and 418 to receive respective main and first pre-cursor tap values a0 and a1. The multipliers feed their respective outputs to an input summer 420. A first slicer 422 couples to the output of the input summer 420 to generate decisions on the state of each received symbol.

Further referring to FIG. 4, the output of the first slicer 422 provides an input to a plurality of feedback paths similar to the feedback paths described with respect to FIG. 3. In this regard, the output of the first slicer 422 feeds a tapped delay line of delay elements 424. Each element exhibits a delay of T, corresponding to the symbol interval time, and has a tapped output that is fed to a multiplier 426. The multipliers 426 receive respective tap weightings W0-Wm determined by an LMS unit 430 to apply to the delayed symbols from the delay elements 424. A feedback summer 428 aggregates the compensation from each of the multipliers 426, and feeds the aggregated output to the input summer 420.

With continued reference to FIG. 4, the second unit branch 406 includes a second slicer 432 with a tapped delay line of delay elements 434 and multipliers 436 that form a set of feedback paths. The set of feedback paths of the second unit branch 406 generally forms a replica of the first slicer 422 and its associated feedback paths. An error summer 438 sums the received sequence of symbols and the compensation from the second unit branch feedback paths and generates an error signal for the LMS unit 430. The error signal may be used for successive iterations in adjusting the tap weights to form a coarse detected sequence of symbols, output from the first slicer 422 along path 440.

Figure 5:
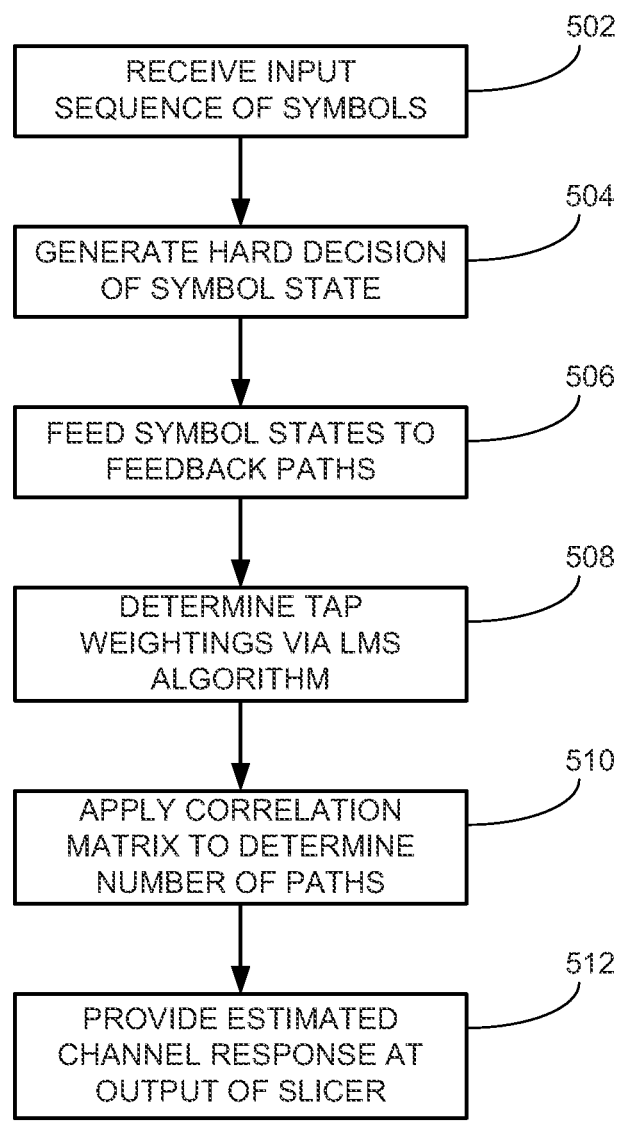
FIG. 5 illustrates a flowchart of steps to determine a coarse channel estimation utilizing either of the coarse channel estimation circuits of FIG. 3 or 4.

FIG. 5 illustrates a flowchart of steps employed in one embodiment of a method of operation to generate a coarse estimated channel response. The method may be used with either of the coarse channel response estimation units described with respect to FIGS. 3 and 4. At step 502, an input sequence of symbols is received at the input summer. As each symbol is sequentially fed to the slicer, a decision is made, at step 504, regarding the symbol state. In one embodiment, the symbol state may be determined to be +1, 0, or −1. The symbol states are fed to the plurality of feedback paths, at step 506, which are selectively activated to apply compensation to the input summer based on prior received symbols. The symbol states are also acted on by an LMS algorithm, at step 508, which determines the appropriate weightings to apply to the equalizer taps associated with each of the feedback paths.

As explained above, each of the coarse channel estimation unit embodiments 300 and 400 employ a given number of feedback paths. The optimum number of paths to use may be determined by a correlation-based thresholding method. A correlation matrix, applied at step 510, used for the method may be defined as:

$$R_{\tilde{x}\tilde{x}} = E\{\tilde{x}\tilde{x}^T\} = \begin{bmatrix} E\{\tilde{x}(t)\tilde{x}(t)\} & E\{\tilde{x}(t)\tilde{x}(t-1)\} & E\{\tilde{x}(t)\tilde{x}(t-2)\} & \ldots \\ E\{\tilde{x}(t)\tilde{x}(t-1)\} & E\{\tilde{x}(t)\tilde{x}(t)\} & E\{\tilde{x}(t)\tilde{x}(t-1)\} & \ldots \\ E\{\tilde{x}(t)\tilde{x}(t-2)\} & E\{\tilde{x}(t)\tilde{x}(t-1)\} & E\{\tilde{x}(t)\tilde{x}(t)\} & \ddots \\ \vdots & \vdots & \ddots & \ddots \end{bmatrix}$$

where $\tilde{x}(t)$ is the detected signal. The thresholding is defined as:

$$|E\{\tilde{x}(t)\tilde{x}(t-\tau)\}| < \delta_{max}, (\tau = 1, \ldots, \tau_{max});$$

$$\frac{\sum_{\tau=1}^{\tau_{max}} |E\{\tilde{x}(t)\tilde{x}(t-\tau)\}|}{\tau_{max}} < \delta_{aver};$$

where $\tau_{max}$ is the maximum observing delay, $\delta_{max}$ is the maximum threshold, and $\delta_{aver}$ is the average threshold.

Once activated, compensation from the activated feedback paths may then be applied to the input summer. For the embodiment shown in FIG. 3, the feedback paths may be incrementally activated in sequence. For the embodiment shown in FIG. 4, the feedback paths may be activated simultaneously. After one or more iterations, the output from the slicer may be provided as an estimated channel response that, at step 512, may be further refined by the fine channel estimation circuit. In some embodiments, if the two thresholds $\delta_{max}$ and $\delta_{aver}$ are satisfied, the output sequence with the current DFE structure is assumed to meet a bit-error-rate (BER) criterion, and the LMS-CE driven by the symbol sequence may be used as the initial channel estimation for the fine channel estimation unit 210 (FIG. 2). Otherwise, the output sequence of the slicer and the LMS-CE may be selected as the optimum choice for the coarse channel estimation.

As shown at a high level in FIG. 2, the coarse channel estimation generated by the coarse channel estimation unit 208 is fed to the fine channel estimation unit 206 to obtain further convergence of the channel impulse response.

Figure 6:
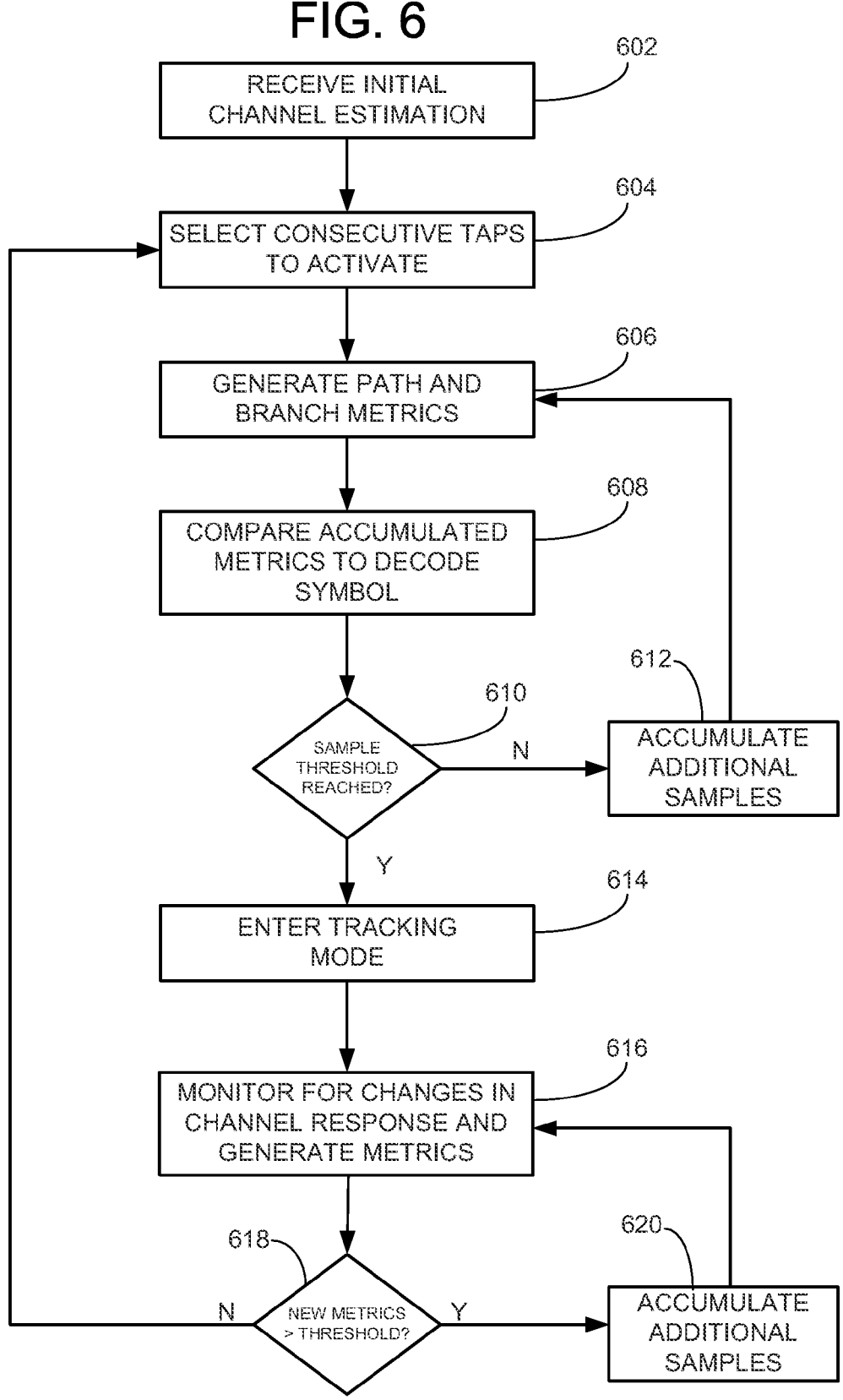
FIG. 6 illustrates steps employed in a method to determine a fine channel estimation based on the coarse channel estimation generated in the method steps of FIG. 5.

FIG. 6 shows a flowchart of steps employed in one embodiment of a method to generate a fine channel estimation based on the coarse channel estimation of FIG. 5. At step 602, the fine channel estimation unit receives the initial channel estimation from the coarse channel estimation unit. As explained above, the fine channel estimation unit includes an MLSE unit that employs Viterbi coding techniques to more accurately determine the symbol sequence. The MLSE also cooperates with an LMS-CE unit which may be separate from or shared with the coarse estimation unit. At step 604, a number of consecutive taps employed by the LMS-CE unit may be activated. In one embodiment, the consecutive taps may be selected based on maximum energy peak values above a predetermined threshold. The number of selected taps also determines the number of states used in the MLSE algorithm.

Further referring to FIG. 6, once the channel estimation window of taps is selected, the fine channel estimating begins, at step 606, by generating path metrics and branch metrics consistent with Viterbi algorithm techniques. In one embodiment, a path metric calculated in the MLSE may be represented by the expression:

$$\Lambda(n)=\Lambda(n-1)+\lambda(n)$$

where $\Lambda(n)$ is the accumulative path metric from the start to sample time n, and $\lambda(n)$ is a branch metric. The branch metric may be expressed as:

$$\lambda(n)=|y(n)-\hat{h}_{MLSE}^T(n)x(c(n-1)\rightarrow c(n))|^2$$

where c(n) represents state in a trellis diagram, and $\hat{h}_{MLSE}$ is the CSI for MLSE. With the path and branch metrics calculated for a given sample time n, a comparison may be carried out, at step 608, with the accumulative path metrics, and an optimum decoded symbol determined. If the number of samples at the given sample time n is less than a predetermined number of samples N, determined at 610, then additional samples may be accumulated, at 612, and new branch and path metrics calculated based on the new samples, at 606.

With continued reference to FIG. 6, once the number of samples reaches the threshold N, the process may enter a tracking mode, at 614. The tracking mode generally operates to detect changes in the channel response, and adaptively update the tap weights to compensate for any changes, at step 616. Following each update, a determination may be made, at 618, as to whether new channel metrics exceed a threshold level. If so, then additional samples may be accumulated, at 620, to allow for further metric generation and updating. If not, then the tracking process terminates, and a new window of consecutive taps may be selected for use by the MLSE, at step 604. Steps 606 to 616 may then be iterated.

Typically, there are L'(L'<L) taps before the estimation of the first actual channel tap in the channel estimation window after the initial coarse channel estimation process. The MLSE also introduces a trace back delay τ', which may be used to specify the number of trellis branches (the number of symbols) that the Viterbi algorithm uses to construct each trace back path. A trace back depth influences the decoding accuracy and delay. In order to refine the channel estimate based on the acquired channel estimate, the LMS-CE may be updated according to the following expressions:

$$e(n)=y(n-L'-\tau')-\hat{h}^T(n)\tilde{y}'(n)$$

$$\hat{h}(n+1)=\hat{h}(n)+\mu e(n)\tilde{y}'(n)$$

where ỹ'(n) is the output of the MLSE.

Figure 7:
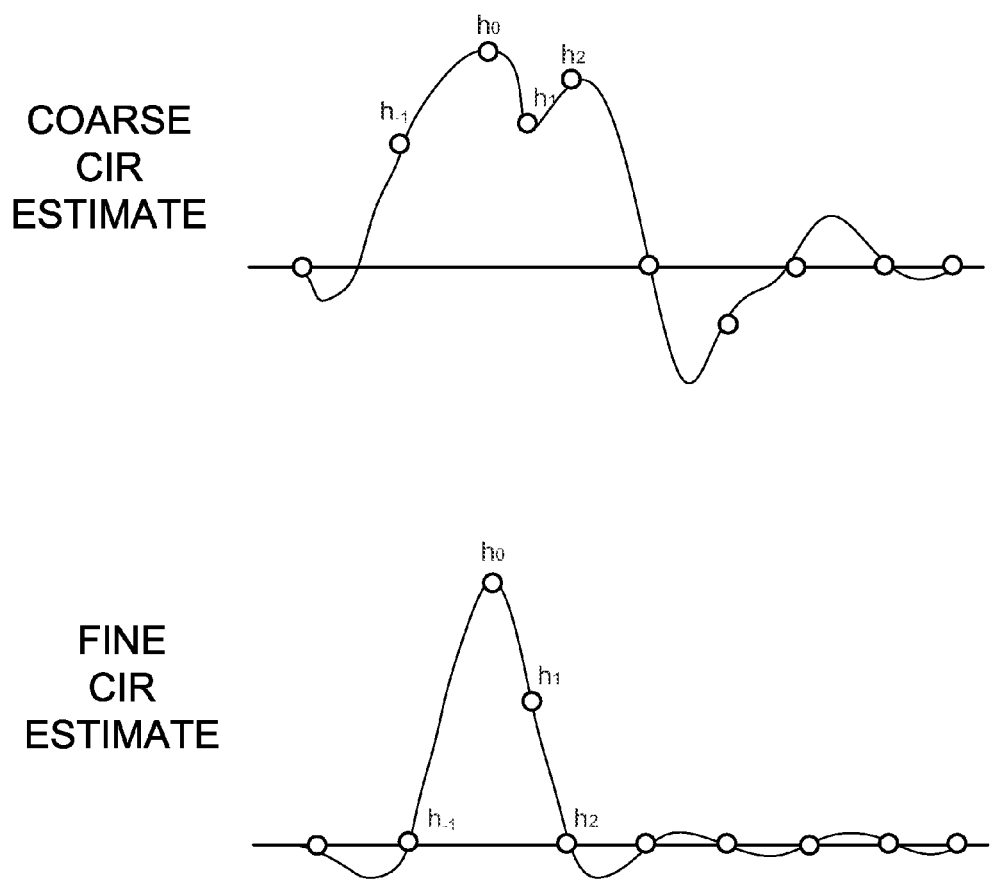
FIG. 7 illustrates a coarse estimate of a channel impulse response using the steps of FIG. 5, and a fine estimate of a channel impulse response using the steps of FIG. 6.

FIG. 7 illustrates respective examples of coarse and fine estimations of a single-bit channel impulse response (CIR) curves using the circuits and methods described herein. Each channel impulse response curve shows a main cursor $h_0$ and various post-cursors, such as $h_1$ and $h_2$, for comparison purposes. A pre-cursor $h_{-1}$ is also shown for situations where an optional linear equalizer is employed for pre-cursor ISI mitigation. Adjusting a given post-cursor tap in accordance with any of the techniques described herein causes the corresponding post-cursor to exhibit a different response characteristic. By generating an accurate channel impulse response based on the circuits and methods described above, sequences of symbols can be accurately determined under challenging signaling conditions.

Those skilled in the art will appreciate the benefits and advantages afforded by the embodiments described herein. For example, the channel estimation circuitry and methods described herein beneficially provide a more straightforward and less complex way to estimate the channel response. By minimizing the complexity, the circuits and methods described herein are more suitable for implementation in systems such as 10GBASE-LRM.

In the foregoing specification, the present embodiments have been described with reference to specific exemplary embodiments thereof. It will, however, be evident that various modifications and changes may be made thereto without departing from the scope of the disclosure as set forth in the appended claims. The specification and drawings are, accordingly, to be regarded in an illustrative sense rather than a restrictive sense.

What is claimed is:

1. A receiver comprising:
   a slicer having an input to receive a sequence of symbols exhibiting inter-symbol-interference (ISI), the slicer configured to detect a state associated with each symbol based on a threshold;
   a feedback equalization unit coupled to the slicer to apply equalization to the sequence of symbols based on prior detected symbol states;
   a Least-Mean-Square (LMS) unit to estimate a channel impulse response based on the equalized symbols; and
   a Maximum-Likelihood-Sequence-Estimation (MLSE) unit to generate an estimated sequence of symbols based on the estimated channel impulse response;
   wherein the feedback equalization unit includes a selectable number of feedback paths coupled to respective equalizer taps, a number of the selectable feedback paths enabled based on a correlation matrix.

2. The receiver of claim 1 embodied as a 10GBASE-LRM Ethernet receiver.

3. The receiver of claim 1, wherein the equalizer taps are shared with the LMS unit.

4. The receiver of claim 1, wherein the estimated channel impulse response generated by the LMS unit comprises a coarse estimation of a channel impulse response, and the MLSE unit generates a fine estimation of the channel impulse response based on the coarse estimation.

5. The receiver of claim 4, wherein the MLSE unit cooperates with the LMS unit to generate the fine estimation of the channel impulse response.

6. The receiver of claim 1, wherein the feedback equalization unit includes plural selectable feedback paths, and wherein the feedback paths are activated in an incremental manner.

7. The receiver of claim 1, wherein the feedback equalization unit includes plural selectable feedback paths, and wherein the feedback paths are activated simultaneously.

8. The receiver of claim 1, wherein the feedback equalization unit includes plural selectable feedback paths including a first set of feedback paths, and a second set of feedback paths that forms a replica of the first set of feedback paths.

9. The receiver of claim 8, wherein the LMS unit is shared by the first and second sets of feedback paths.

10. The receiver of claim 1, wherein in a first mode, the estimated sequence comprises a coarse estimation of a channel impulse response.

11. The receiver of claim 10, wherein in a second mode, the estimated sequence comprises a fine estimation of the channel impulse response.

12. The receiver of claim 1, further comprising a linear equalizer coupled to the input of the slicer.

13. The receiver of claim 12, wherein the linear equalizer comprises a feed-forward equalizer having fixed taps to compensate for pre-cursor ISI.

14. A method of determining an output data sequence from an input sequence affected by inter-symbol-interference (ISI), the method comprising:
   receiving, at a slicer, an input symbol sequence;
   slicing, at the slicer, the input symbol sequence to initially determine respective symbol states;
   feeding back selected determined symbol states, at a feedback equalization unit, to equalize the input sequence;
   estimating, using a Least-Mean-Square (LMS) unit, a channel impulse response based on the slicing and feeding back; and
   estimating, using a Maximum-Likelihood-Sequence-Estimation (MLSE) unit, a most likely sequence of output bits based on the estimated channel impulse response;
   wherein the feedback equalization unit includes a selectable number of feedback paths coupled to respective equalizer taps, a number of the selectable feedback paths enabled based on a correlation matrix.

15. The method of claim 14, further comprising:
   iteratively updating the estimated channel impulse response to track changes in the channel impulse response.

16. The method of claim 14, wherein feeding back selected determined symbol states comprises:
   incrementally activating plural feedback paths.

17. The method of claim 14, wherein feeding back selected determined symbol states comprises:
   simultaneously activating plural feedback paths.

18. The method of claim 14, wherein estimating a channel impulse response comprises:
   generating a coarse estimate of a channel impulse response.

19. The method of claim 18, wherein estimating further comprises:
   generating a fine estimate of the channel impulse response based on the coarse estimate.

* * * * *